United States Patent
Greiner et al.

(10) Patent No.: US 10,551,158 B2
(45) Date of Patent: Feb. 4, 2020

(54) IMPACT-DETECTION DEVICE, IN PARTICULAR FOR A MISSILE COMPRISING AT LEAST ONE WAVEGUIDE EXTENDS THROUGH THE CROSS-SECTION OF AN ANNUAL RING

(71) Applicant: MBDA FRANCE, Le Plessis-Robinson (FR)

(72) Inventors: Bernard Greiner, Orsay (FR); Mathieu Loosfeld, Massy (FR); Kevin Tastets, La Celle Saint Cloud (FR)

(73) Assignee: MBDA FRANCE, Le Plessis-Robinson (FR)

( * ) Notice: Subject to any disclaimer, the term of this patent is extended or adjusted under 35 U.S.C. 154(b) by 128 days.

(21) Appl. No.: 15/567,021

(22) PCT Filed: Apr. 12, 2016

(86) PCT No.: PCT/FR2016/000073
§ 371 (c)(1),
(2) Date: Oct. 16, 2017

(87) PCT Pub. No.: WO2016/170235
PCT Pub. Date: Oct. 27, 2016

(65) Prior Publication Data
US 2018/0135955 A1    May 17, 2018

(30) Foreign Application Priority Data

Apr. 20, 2015    (FR) ...................................... 15 00818

(51) Int. Cl.
*F42C 1/00* (2006.01)
*F42C 19/07* (2006.01)
*G01D 5/353* (2006.01)

(52) U.S. Cl.
CPC ................ *F42C 19/07* (2013.01); *F42C 1/00* (2013.01); *G01D 5/3537* (2013.01)

(58) Field of Classification Search
CPC .......... B60R 21/0136; B60R 2021/343; G01L 5/0052; G01L 1/243; G01D 5/165;
(Continued)

(56) References Cited

U.S. PATENT DOCUMENTS 3,589,295 A      6/1971  Packer
4,411,198 A  * 10/1983  Shrader ................... F42C 19/06
                                                                102/216
(Continued)

FOREIGN PATENT DOCUMENTS

GB          2 198 504 A      6/1988

OTHER PUBLICATIONS

Written Opinion of the International Searching Authority dated Jul. 12, 2016, issued in corresponding International Application No. PCT/FR2016/000073, dated Apr. 12, 2016, 5 pages.
(Continued)

*Primary Examiner* — Que Tan Le
(74) *Attorney, Agent, or Firm* — Christensen O'Connor Johnson Kindness PLLC

(57) ABSTRACT

An impact-detection device includes at least one waveguide provided at each of the two ends thereof with a connector. The device further includes a ring with a curved outer contour. The ring forms a separate part with planar radial surfaces. The waveguide is built into the body of the ring about the ring, and the two ends of the waveguide are arranged on the outside of the ring.

19 Claims, 5 Drawing Sheets

(58) Field of Classification Search
CPC ...... G01D 5/353; G01D 5/3537; F24C 19/07; G01M 17/0078; F42C 19/07; F42C 1/00
USPC .............................................. 250/231.1, 221
See application file for complete search history.

(56) References Cited

U.S. PATENT DOCUMENTS

| | | | |
|---|---|---|---|
| 7,548,679 B2* | 6/2009 | Hirano | G02B 6/4457 385/134 |
| 2010/0307363 A1 | 12/2010 | Chishinski | |

OTHER PUBLICATIONS

International Preliminary Report on Patentability dated Oct. 24, 2017, issued in corresponding International Application No. PCT/FR2016/000073, dated Apr. 12, 2016, 1 page.
International Search Report and Translation dated Jul. 12, 2016, issued in corresponding International Application No. PCT/FR2016/000073, filed Apr. 12, 2016, 5 pages.
Written Opinion of the International Searching Authority dated Jul. 12, 2016, issued in corresponding International Application No. PCT/FR2016/000073, dated Apr. 12, 2016, 7 pages.

* cited by examiner

IMPACT-DETECTION DEVICE, IN PARTICULAR FOR A MISSILE COMPRISING AT LEAST ONE WAVEGUIDE EXTENDS THROUGH THE CROSS-SECTION OF AN ANNUAL RING

CROSS-REFERENCE TO RELATED APPLICATION

This application is a National Stage of WOSN PCT/FR2016/000073, filed Apr. 12, 2016, which claims priority from FRSN 1500818, filed Apr. 20, 2015.

FIELD OF THE DISCLOSURE

The present invention relates to an impact detection device, in particular for a missile.

BACKGROUND

Detecting the impact of a missile on a target makes it possible to activate a lethal chain of the missile. To do this, it is necessary to know the precise moment of the impact of the front point of the missile on the target so as to be able to trigger the lethal chain at the optimum moment.

For this purpose, the missile must be provided with an impact detection device (or impact sensor) which meets very strict conditions. In particular:
- the impact sensor must not be destroyed before it has sent the impact information to a system for triggering the warhead(s);
- the probability of the impact sensor functioning correctly must be as high as possible;
- the probability of a false alarm leading to the warhead being triggered at the wrong time must be as low as possible; and
- the dating of the moment of the impact must be very precise.

Generally, the impact sensor must also be configured so as to take into account the presence of a homing device in the front point of the missile. Most missiles having homing devices integrate sensors for detecting the target. These sensors can be proximity sensors ("proximity fuses") when triggering the warhead close to the target is required.

When detecting the impact of the front point on the target is required, a device which is designed to detect the opening (rupture) of an electrical conductor loop is frequently used. However, the reliability of an electrical conductor loop of this type is not optimal. There is a risk that the electrical loop will close again, if only very briefly, during the shock. Furthermore, in some configurations, using an electrical device can pose problems in terms of safety with respect to the warhead, which can be arranged close by, making it necessary to put into place electromagnetic shielding (increasing the mass of the assembly).

To remedy some of these drawbacks, FR 2 549 595 discloses an impact sensor for a projectile which can come into contact with a target in any zone of a casing. The casing is limited to a nose covering a front portion of the structure of the projectile. The impact sensor comprises a dielectric optical waveguide which is rigidly connected to the casing in all the zones that may come into contact with the impact and which transmits a luminous flux from a transmitter to a receiver. The dielectric guide is formed by an optical fibre or by a bundle of optical fibres which are flexible enough to follow a winding path over the casing. The optical fibre is wound in a fixed-pitch or variable-pitch helix whilst being fixed outside or inside the nose.

However, this conventional impact sensor having a dielectric optical waveguide is not optimal. In particular, said sensor is difficult to fit, difficult to reproduce, and it is difficult to predict how it will rupture.

SUMMARY

The object of the present invention is to remedy at least some of these drawbacks. The present invention relates to an impact detection device, in particular for a missile, said device comprising at least one waveguide provided with a connector at each of the two ends thereof.

According to the invention, said device comprises a ring having a curved outer contour, said ring forming a separate part having planar radial surfaces, and said waveguide is integrated in the thickness of the ring around said ring, the two ends of the waveguide being arranged outside the ring.

Thus, by integrating the waveguide in the material (specified hereinafter) of the ring, the manner in which the connection formed by the waveguide will rupture can be predicted, as specified below. In addition, the impact detection device thus comprises an annular part which can be easily reproduced and easily fitted, even on different types of missile. Advantageously:
- said ring is produced from one of the following materials: a plastics material, a composite material, an amorphous material, a crystalline material; and/or
- said waveguide corresponds to one of the following elements: an optical fibre, a waveguide structure.

In one specific embodiment, the part comprises a glob topping in the region of a zone outside the ring in which two parts of the waveguide come out, said waveguide corresponding to an optical fibre.

Furthermore, advantageously, at least one part of at least one end portion of the waveguide, which is arranged outside the ring, is provided with a mechanical protection sheath.

Furthermore, in a specific embodiment:
- said ring comprises at least one weakening zone formed by an indentation in material;
- the weakening zone is arranged close to a fixing zone for fixing the ring.

The present invention also relates to an impact detection system. According to the invention, said system comprises an impact detection device of the above-mentioned type, and a signal-processing unit. The signal-processing unit comprises at least one element for emitting an optical beam, an element for detecting an optical beam and a data-processing element connected to said emission and detection elements. The signal-processing unit is connected to the waveguide of the impact detection device in such a way that the emission element is capable of emitting an optical beam into one of the two ends of the waveguide, and the detection element is capable of detecting an optical beam of this type when said beam is output to the other of the ends of the waveguide.

The present invention further relates to a missile comprising a body and, at the front end in the direction of travel of said missile, a forebody, the forebody being fixed to the front of the body by means of a fixing interface, said missile comprising:
- an impact detection device of the above-mentioned type, which is arranged between the cylindrical body and the forebody in the region of the fixing interface; and/or
- an impact detection system of the type described above.

In a specific embodiment, the ring of the impact detection device has a cross section corresponding to the cross section of the missile in the region of the fixing interface.

The present invention further relates to a method for producing an impact detection device preferably comprising an optical fibre as a waveguide. According to the invention, said method comprises at least the following sequence of consecutive steps, consisting in:

forming at least one layer of material;
making a circular groove in the layer of material, said circular groove being intended to act as a recess;
fitting the optical fibre in the recess formed by said circular groove, ensuring that the two ends of the optical fibre come out of the material;
arranging at least one additional layer of material on said layer of material and said circular groove so as to form an integral assembly, the recess of which is closed; and
cutting out a ring in said integral assembly around said recess so as to form said separate part.

Advantageously, said method comprises an additional step consisting in producing a glob topping in the region of a zone in which the two ends of the optical fibre come out.

DESCRIPTION OF THE FIGURES

The accompanying drawings will show how the invention can be carried out. In these drawings, same reference numerals denote like elements.

DETAILED DESCRIPTION

Figure 1:
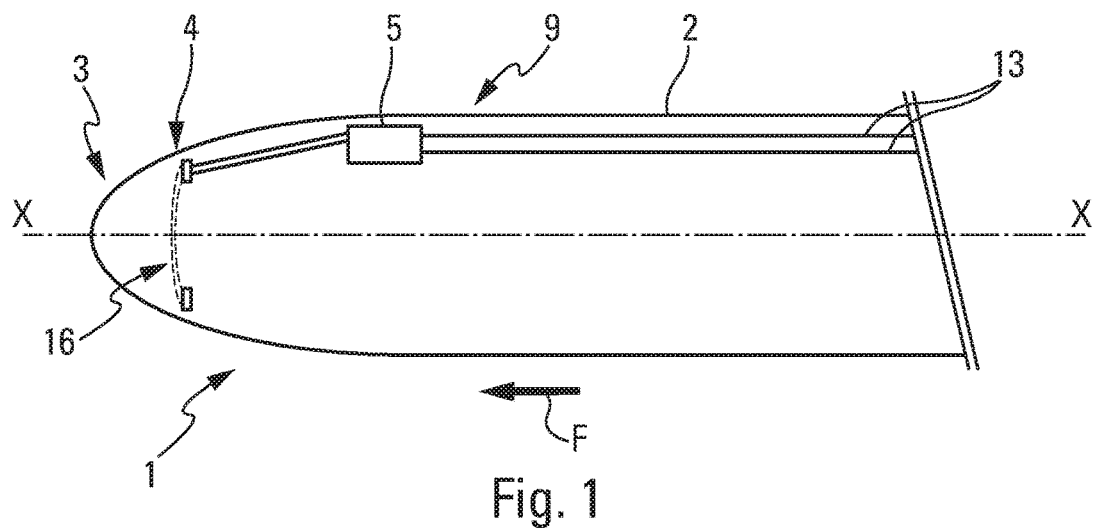
FIGS. 1 and 2 are highly schematic views of a front portion of a missile to which the present invention relates.
Figure 2:
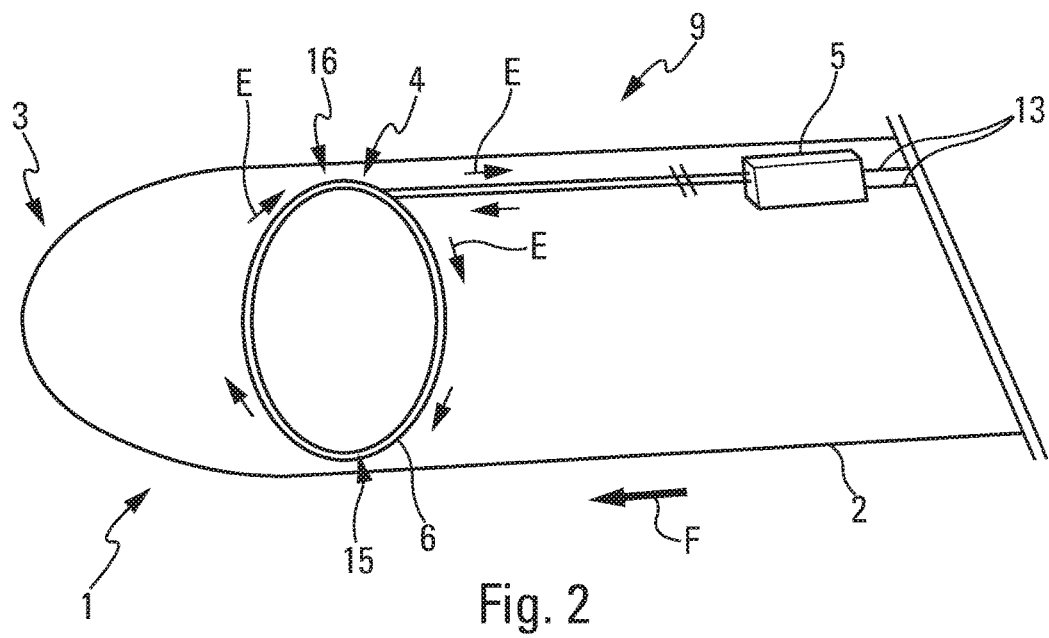

The present invention relates to a missile 1 shown schematically and in part in FIGS. 1 and 2, which comprises a cylindrical body 2 having a longitudinal axis X-X provided with a forebody 3 at the front (in the direction of travel F of said missile 1).

The missile 1 also comprises conventional means (not shown) for the guiding thereof, such as flight controls, and integrated elements, in particular a homing device and a warhead (also not shown).

The forebody 3 is fixed to the front of the body 2 by means of a fixing interface (not shown specifically).

The missile 1 also comprises an impact detection system (hereinafter referred to as "system 9"). Said on-board system 9 comprises, as shown for example in FIG. 3:
an impact detection device (hereinafter referred to as "device 4"), which is arranged between the cylindrical body 2 and the forebody 3 in the region of the fixing interface; and
a signal-processing unit 5.

Figure 4:
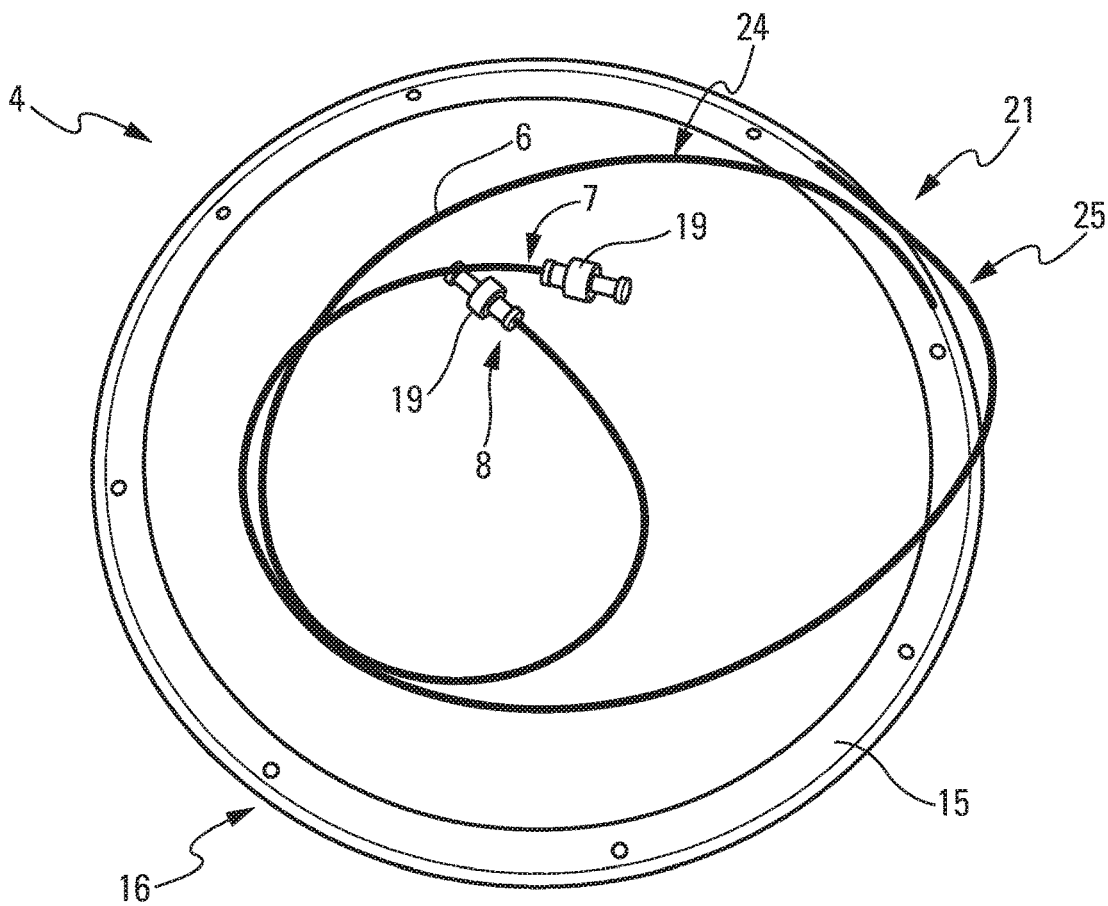
FIGS. 4 and 5 are schematic views of specific embodiments of an impact detection device.
Figure 5:
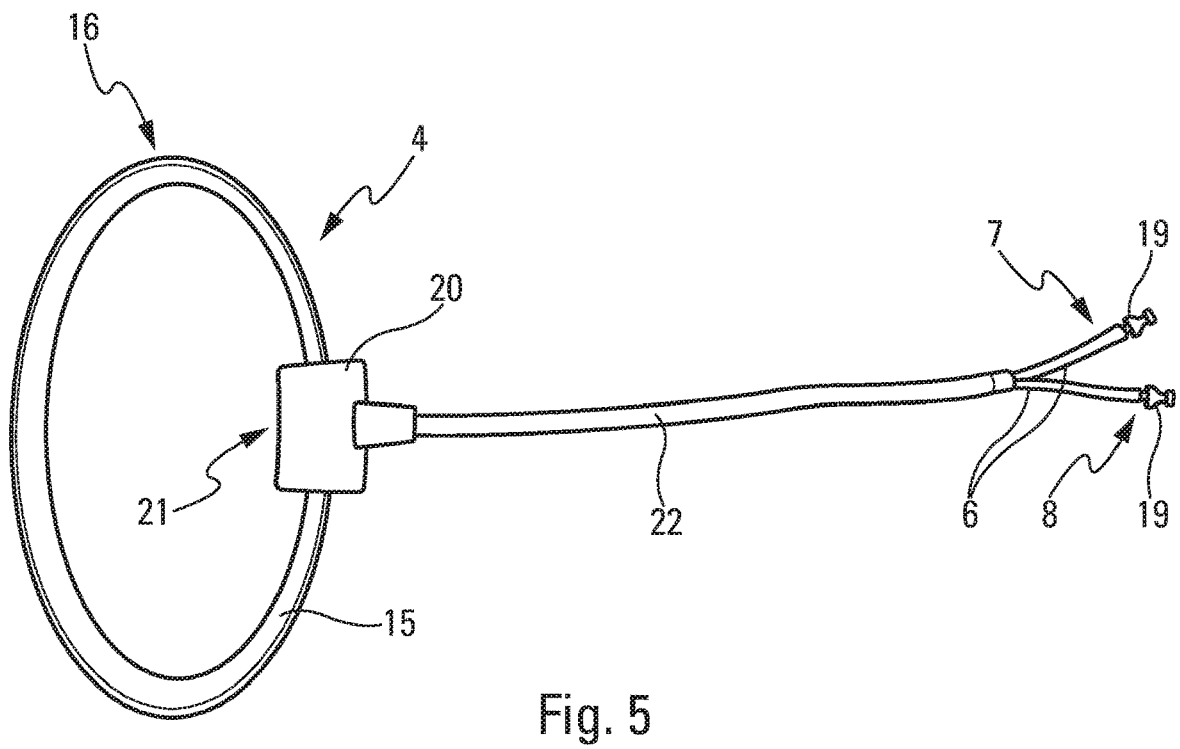

The (impact detection) device 4 comprises at least one waveguide 6 provided with a conventional connector 19 at each of the two ends 7 and 8 thereof (FIGS. 4 and 5).

Figure 3:
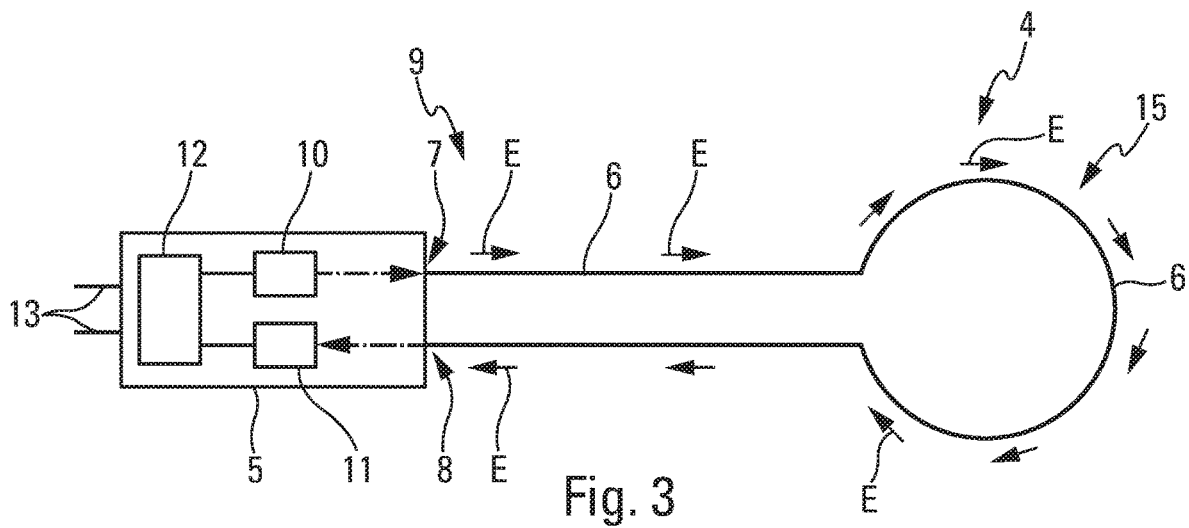
FIG. 3 is a block diagram of an impact detection system.

As shown in FIG. 3, the signal-processing unit 5 comprises an element 10 for emitting an optical beam, which is connected by a connection element cooperating with the connector 19 at the end 7 and which emits an optical beam into the waveguide 6 at said end 7. Said optical beam travels in the waveguide 6, as illustrated by arrows E in FIGS. 2 and 3. The signal-processing unit 5 also comprises an element 11 for detecting an optical beam, which is connected by a connection element cooperating with the connector 19 at the end 8 of the waveguide 6 and which receives the optical beam emitted by the element 10 after the passage thereof in the waveguide 6, and a data-processing element 12 connected to said emission and detection elements 10 and 11.

The signal-processing unit 5 is thus connected to the waveguide 6 of the device 4 in such a way that the emission element 10 is capable of emitting an optical beam into the end 7 of the waveguide 6, and the detection element 11 is capable of detecting an optical beam of this type when said beam is output to the other end 8 of the waveguide 6.

In the event of impact of the missile 1 on a target, the waveguide 6 of the device 4 is broken in such a way that an optical beam emitted by the emission element 10 does not reach the detection element 11 and thus is not detected by said detection element 11. The unit 5 can then notify on-board means, and in particular a system for triggering an on-board warhead, of said rupture, via connections 13, which system can then trigger said warhead.

Figure 6:
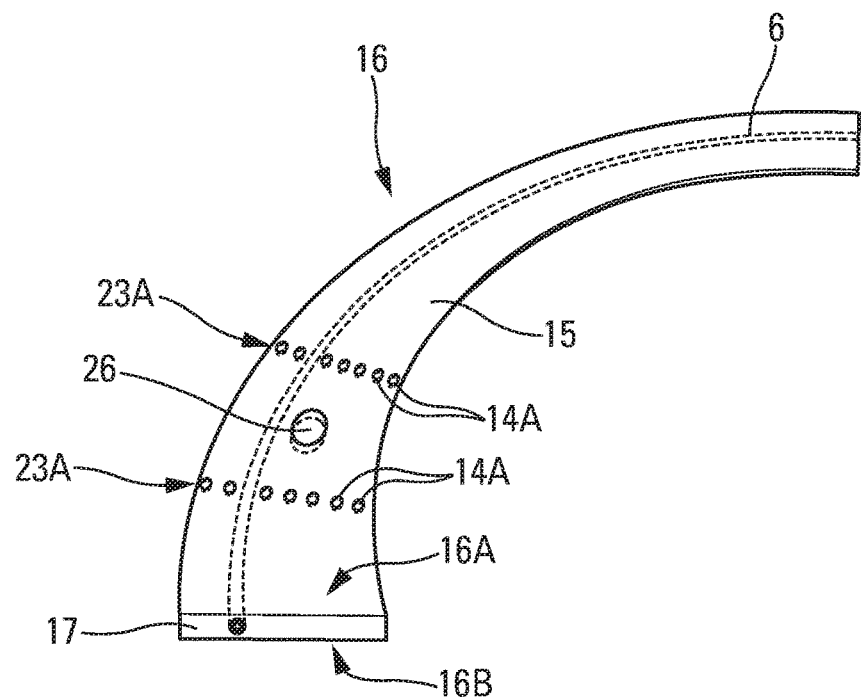
FIGS. 6 and 7 are schematic views of portions of a ring of an impact detection device according to two different variants.
Figure 7:
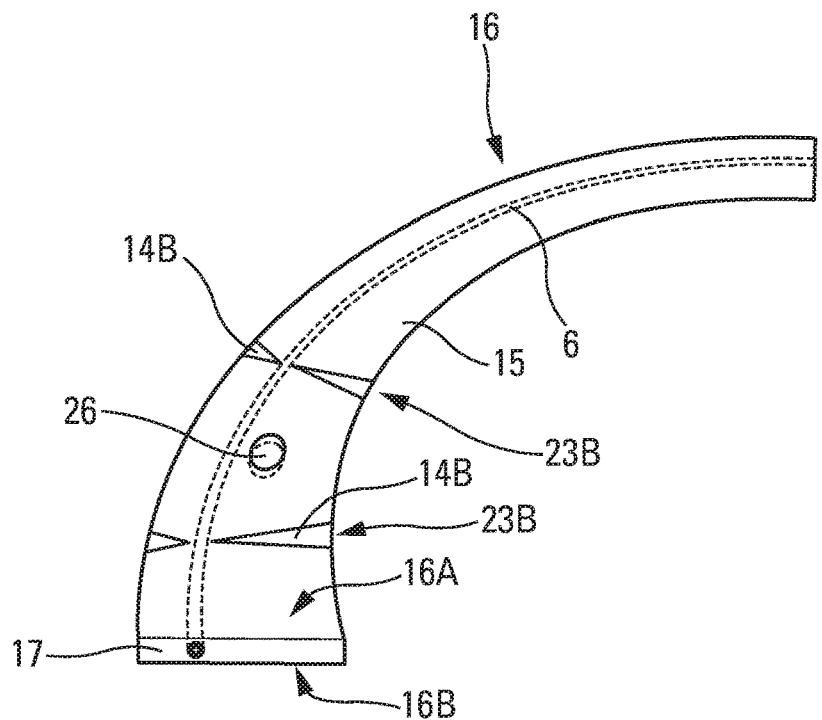
Figure 8:
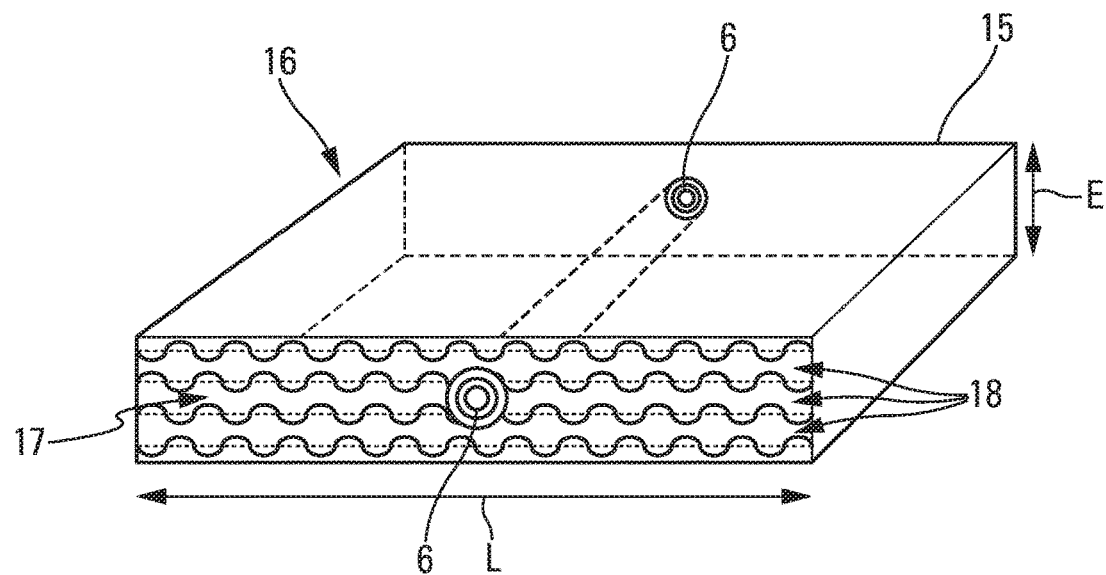
FIG. 8 is a schematic view showing a portion of a waveguide integrated in the thickness of a portion of an annular part.

According to the invention, as shown in particular in FIGS. 4 and 5:
the device 4 comprises a ring 15 having a curved outer contour;
the ring 15 forms a separate part 16 having planar radial surfaces 16A and 16B (FIGS. 6 and 7);
said waveguide 6 is integrated in the thickness of the ring 15 (provided with a material 17), as shown in FIG. 8, and is arranged along (that is to say around) said ring 15, as can be seen in FIGS. 6, 7 and 8; and
the ends 7 and 8 of the waveguide 6 are arranged outside the ring 15.

By integrating the waveguide 6 in the material 17 of the ring 15, the manner in which the connection formed by the waveguide 6 will rupture can be predicted, as specified below. In addition, the device 4 thus comprises an annular part 16 which can be easily reproduced and easily fitted, even on different types of missile.

Within the scope of the present invention, said ring 15 can be produced from different materials and in particular from a plastics material, an amorphous material or a crystalline material. Preferably, said ring is produced from a composite material.

By way of illustration, in the example in FIG. 8, the waveguide 6 is stratified in a composite or plastics material 17, of which superimposed layers 18 can be seen.

Within the scope of the present invention, said waveguide 6 corresponds to one of the following elements: an optical fibre, as shown in the example in FIGS. 4 and 5 in particular, or a waveguide structure, for example made of a polymer, formed directly in the material 17.

Preferably, the ring 15 is fitted on the missile 1, being centred in relation to the axis X-X of said missile 1, for example being coaxial with the axis X-X in the case of a ring having a round cross section.

In a specific embodiment, the part 16 comprises, as shown in FIG. 5, a glob topping 20 in the region of a zone 21 outside the ring 15 in which two parts 24 and 25 (having respective free ends 7 and 8) of the waveguide 6 come out (FIG. 4). The waveguide 6 corresponds to an optical fibre in this example. Furthermore, in a specific embodiment, at least one part of the end portions (or parts) 24 and 25 of the waveguide 6, arranged outside the ring 15, are provided with a mechanical protection sheath 22, as shown in FIG. 5.

Furthermore, in a preferred embodiment, said ring 15 comprises weakening zones 23A, 23B, as shown in FIGS. 6 and 7. Said weakening zones 23A, 23B are formed by an indentation in material in the thickness of the ring 15.

The indentation in material can correspond to a sequence of holes 14A, which are or are not through-holes, along a line defining a weakening line (weakening zone 23A) for confining and facilitating a rupture, as shown in FIG. 6. Such holes 14A can be produced easily, for example by machining or by laser.

The indentation in material for confining and facilitating a rupture can also correspond to one or more cut-outs 14B produced in the ring 15 (weakening zone 23B) for example diagonally, as shown in FIG. 7.

Figure 10:
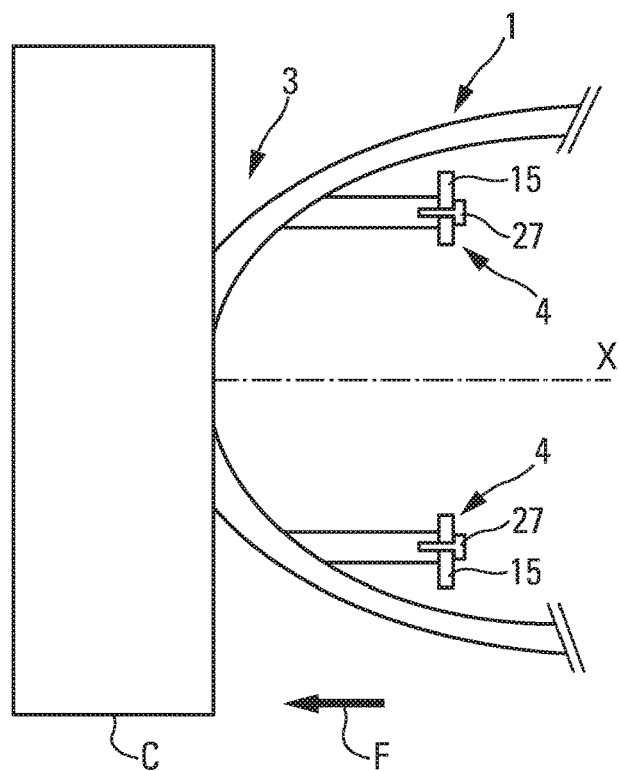

In addition, the weakening zone or zones 23A and 23B are arranged close to one or more fixing zones (or points) 26 (that is to say a hole for fixing in the example in FIGS. 6 and 7) for fixing the ring 15 to the missile 1, by conventional fixing means, for example screws 27 (FIG. 10). The fixing means can also be of another type, such as a structural adhesive. This closeness between one or more weakening zones 23A, 23B and one or more fixing zones 26 makes it possible to confine and facilitate the rupture of the ring 15 in at least one weakening zone, and thus the rupture of the waveguide 6 during an impact.

During a shock of the missile 1 against a target C (FIGS. 9 to 11), the mechanical deformation opens up (breaks) the optical circuit comprising the waveguide 6. This principle applies irrespective of the operational travel speed of the missile 1 and irrespective of the angle of incidence of the missile 1 on the target C. The rupture of the optical connection is entirely predictable because the supporting structure thereof is composed of a material, for example a composite or plastics material, of which the dynamic behaviour in shock is controlled. The use of mechanical fixings, as well as holes or weakening cut-outs, makes it possible to concentrate the forces in well-defined zones and thus predict the moment that the connection will rupture. The number, the shape and the position of the mechanical fixings can vary. The moment of rupture in a specific embodiment of the device fitted on a specific missile during an impact is determined empirically (theoretical calculation and experiments) and is thus identical for similar device/missile pairs.

Furthermore, the shape of the ring 15 of the device 4 can also vary (round, square, oblong, etc.) according to the shape of the cross section of the missile 1 to which it is adapted. Furthermore, by way of illustration, the ring 15 can have a width L of between 0.5 cm and 5 cm, and a thickness E of between 0.5 mm and 5 mm (FIG. 8). Furthermore, the waveguide can be of various types (optical fibre, waveguide 6, polymer waveguide, etc.).

Figure 9:
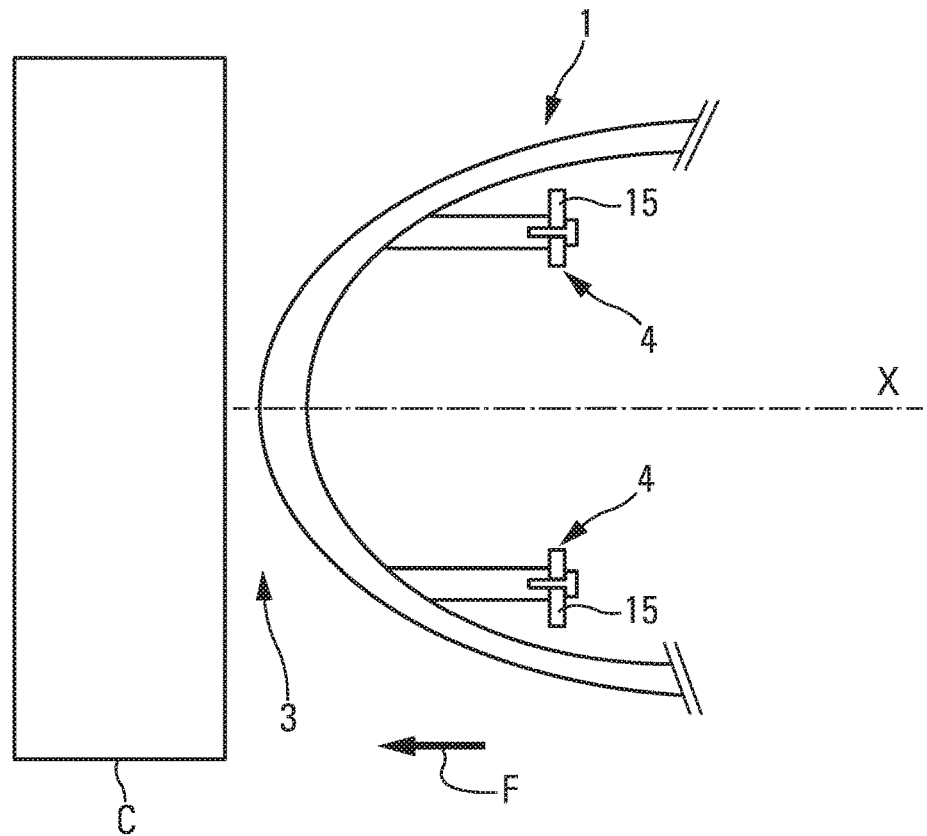
FIGS. 9 to 11 are schematic views of different consecutive positions during the impact of a missile provided with an impact detection device on a target.
Figure 11:
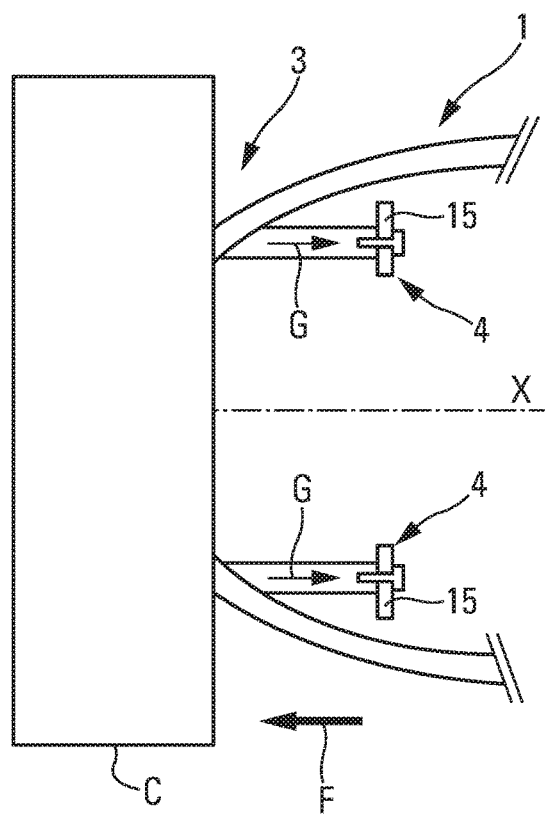

FIGS. 9, 10 and 11 schematically show different consecutive positions of the front 3 of the missile 1 equipped with the device 4 during the impact thereof on a target C, for example a portion of a mobile machine or of a building. More specifically:
FIG. 9 shows the approach of the missile 1 to the target C;
FIG. 10 shows the contact of the missile 1 with the target C resulting in a deformation of the front 3 of the missile 1; and
FIG. 11 shows the transfer of mechanical force (shown by arrows G) of the target C towards the device 4 resulting in the rupture of the waveguide 6 that is integrated in the ring 15.

The mechanical configuration of the device 4 on the mechanical body thereof makes it possible to precisely predict the moment of rupture of the waveguide 6 and thus to calibrate the triggering of the lethal chain with great precision.

The device 4, as described above, is thus based on the rupture of an optical waveguide 6, stratified in a composite or plastics material or integrated in an amorphous or crystalline material. The integration of the device 4 in a mechanical structure makes it possible to predict the manner of rupture. In addition, the above-mentioned features of the device 4 ensure a straightforward and definitive opening. Furthermore, the mechanical behaviour of the device 4 improves precision and allows excellent reproducibility.

The device 4 can be applied to all speed ranges of existing missiles (subsonic/supersonic).

The precision of the firing system of the warhead is thus greatly improved by strong connections between the waveguide and the material (plastics/composite matrix in particular).

Furthermore, the device 4 offers better performance than an electrical system. It reduces the risk of re-closure during a high-speed impact, by means of the small diameter of the waveguide 6, which is approximately a few μm. In addition, the bulk is reduced, and the device 4 has a smaller mass than an electrical system.

Hereinafter, a method for producing a device 4 of the type described above is disclosed, which is provided with an optical fibre as a waveguide. Said method comprises the following sequence of consecutive steps:
E1/forming at least one layer of material, for example a composite material;
E2/making a circular groove in the layer of material, said circular groove being intended to act as a recess;
E3/fitting an optical fibre in the recess formed by said circular groove, ensuring that the two ends of the optical fibre come out of the material;
E4/arranging at least one additional layer of material on said layer of material and said circular groove so as to form an integral assembly, the recess of which is closed; and
E5/cutting out a ring in said integral assembly around said recess so as to form said separate part 16, as shown in FIG. 4.

Said method also comprises an additional step E6/consisting in producing a glob topping 20 (FIG. 5) in the region of a zone 21 in which the two ends of the optical fibre 6 come out, and an additional step consisting in fixing connectors 19 to said ends.

Consequently, the device 4 has in particular the following main advantages:
the use of an optical waveguide 6, which is preferably stratified in a composite or plastics material, makes it possible to predict the manner in which said connection will rupture over all speed ranges of the existing missiles (subsonic/supersonic);
the optical portion of the system 9 is not sensitive to electromagnetic waves (conducted/emitted);
the device 4 makes it possible to avoid risks of false alarms or re-closure; and
the mass of the device 4 can be significantly reduced by removing all metal material (30% or more).

The invention claimed is:

1. An impact detection device, in particular for a missile, said device comprising:
   at least one waveguide provided with a connector at each of the two ends thereof; and
   an annular ring having a cross-sectional area with a width defined by a curved outer contour and a curved inner contour and a thickness defined by offset planar surfaces, the inner contour further defining an aperture extending through the annular ring, wherein said waveguide extends through the cross-section of the ring around at least a portion of the ring, the two ends of the waveguide being arranged outside the ring.

2. The device according to claim 1, wherein said ring comprises at least one of a plastic material, a composite material, an amorphous material, and a crystalline material.

3. The device according to claim 1, wherein said waveguide corresponds to one of an optical fiber and a waveguide structure.

4. The device according to claim 1, wherein the part comprises a glob topping in a region of a zone outside the ring in which two parts of the waveguide come out, said waveguide corresponding to an optical fiber.

5. The device according to claim 1, wherein at least one part of at least one end portion of the waveguide, which is arranged outside the ring, is provided with a mechanical protection sheath.

6. The device according to claim 1, wherein said ring comprises at least one weakening zone formed by an indentation in material.

7. The device according to claim 6, wherein the weakening zone is arranged proximate to a fixing zone configured to fix the ring.

8. An impact detection system, comprising:
   an impact detection device according to claim 1; and
   a signal-processing unit, the signal-processing unit comprising:
      at least one element for emitting an optical beam;
      an element for detecting an optical beam; and
      a data-processing element connected to said emission and detection elements, wherein the signal-processing unit is connected to the waveguide of the impact detection device in such a way that the emission element emits an optical beam into one of the two ends of the waveguide, and the detection element detects the optical beam when said beam is output to the other of the ends of the waveguide.

9. A missile, comprising:
   a body;
   at the front end in the direction of travel of said missile, a forebody, the forebody being fixed to the front of the body by a fixing interface; and
   an impact detection device arranged between the body and the forebody in the region of the fixing interface, the device comprising:
      at least one waveguide provided with a connector at each of the two ends thereof; and
      a ring having a curved outer contour, said ring forming a separate part having planar radial surfaces, wherein said waveguide is integrated in the thickness of the ring around said ring, the two ends of the waveguide being arranged outside the ring.

10. The missile according to claim 9, wherein the ring of the impact detection device has a cross section corresponding to the cross section of the missile in the region of the fixing interface.

11. A method for producing an impact detection device according to claim 1, comprising
    the consecutive steps of:
       forming at least one layer of material;
       making a circular groove in the layer of material, said circular groove being defining a recess;
       fitting an optical fiber in the recess, ensuring that the two ends of the optical fiber come out of the material;
       arranging at least one additional layer of material on said layer of material and said circular groove to form an integral assembly, the recess of which is closed; and
       cutting out a ring in said integral assembly around said recess to form said separate part.

12. The method according to claim 11, further comprising the step of producing a glob topping in the region of a zone in which the two ends of the optical fiber come out.

13. The missile according to claim 9, wherein said ring comprises at least one of a plastic material, a composite material, an amorphous material, and a crystalline material.

14. The missile according to claim 9, wherein said waveguide corresponds to one of an optical fiber and a waveguide structure.

15. The missile according to claim 9, wherein the part comprises a glob topping in a region of a zone outside the ring in which two parts of the waveguide come out, said waveguide corresponding to an optical fiber.

16. The missile according to claim 9, wherein at least one part of at least one end portion of the waveguide, which is arranged outside the ring, is provided with a mechanical protection sheath.

17. The missile according to claim 9, wherein said ring comprises at least one weakening zone formed by an indentation in material.

18. The missile according to claim 17, wherein the weakening zone is arranged proximate to a fixing zone configured to fix the ring.

19. The missile according to claim 9, further comprising a signal-processing unit operably connected to the waveguide, the signal-processing unit comprising:
    at least one element for emitting an optical beam;
    an element for detecting an optical beam; and
    a data-processing element connected to said emission and detection elements, wherein emission element emits an optical beam into one of the two ends of the waveguide, and the detection element detects the optical beam when said beam is output to the other of the ends of the waveguide.

* * * * *